(12) United States Patent
Sasaki et al.

(10) Patent No.: US 9,925,875 B2
(45) Date of Patent: Mar. 27, 2018

(54) INFORMATION PRESENTATION DEVICE, INFORMATION PRESENTATION METHOD AND PROGRAM

(71) Applicant: CLARION CO., LTD., Saitama-shi, Saitama (JP)

(72) Inventors: Akira Sasaki, Tokyo (JP); Naokazu Uchida, Tokyo (JP); Takashi Matsubara, Tokyo (JP)

(73) Assignee: Clarion Co., Ltd., Saitama (JP)

( * ) Notice: Subject to any disclaimer, the term of this patent is extended or adjusted under 35 U.S.C. 154(b) by 0 days.

(21) Appl. No.: 15/317,391

(22) PCT Filed: Jun. 3, 2015

(86) PCT No.: PCT/JP2015/066094
§ 371 (c)(1),
(2) Date: Dec. 8, 2016

(87) PCT Pub. No.: WO2016/002420
PCT Pub. Date: Jan. 7, 2016

(65) Prior Publication Data
US 2017/0106752 A1    Apr. 20, 2017

(30) Foreign Application Priority Data

Jul. 1, 2014  (JP) ................. 2014-135828

(51) Int. Cl.
*B60K 35/00* (2006.01)
*B60R 16/02* (2006.01)
(Continued)

(52) U.S. Cl.
CPC .......... *B60K 35/00* (2013.01); *B60R 11/0229* (2013.01); *B60R 16/02* (2013.01); *G08G 1/16* (2013.01); *G09G 5/00* (2013.01)

(58) Field of Classification Search
CPC combination set(s) only.
See application file for complete search history.

(56) References Cited

U.S. PATENT DOCUMENTS

| 8,477,023 B2 * | 7/2013 | Tauchi | B60K 35/00 340/439 |
| 2008/0252579 A1 * | 10/2008 | Kato | B60K 35/00 345/87 |

(Continued)

FOREIGN PATENT DOCUMENTS

| EP | 0771686 A2 | 5/1997 |
| JP | 2002-046505 A | 2/2002 |

(Continued)

OTHER PUBLICATIONS

Office Action in EP counterpart Application No. 15815792 dated Dec. 12, 2017.

*Primary Examiner* — Travis Hunnings
(74) *Attorney, Agent, or Firm* — Volpe and Koenig, P.C.

(57) ABSTRACT

In order to provide a technology enabling efficient visual recognition of notification information by a user, provided is an information presentation device, including: a display adjustment unit configured to display, using processing information for displaying information based on a start condition, the information on a plurality of display areas; and a storage unit configured to store condition information associating a predetermined start condition with notification information being the information to be displayed when the predetermined start condition occurs, in which the display adjustment unit is configured to, when satisfaction of the predetermined start condition is detected: identify the display area for displaying the notification information that is associated with the predetermined start condition in the (Continued)

storage unit; cause display of the notification information on the display area; and restrict display on other display areas other than the display area.

10 Claims, 13 Drawing Sheets

(51) Int. Cl.
*G09G 5/00* (2006.01)
*B60R 11/02* (2006.01)
*G08G 1/16* (2006.01)

(56) References Cited

U.S. PATENT DOCUMENTS

| 2008/0309474 | A1 | 12/2008 | Okamoto et al. | |
|---|---|---|---|---|
| 2016/0266767 | A1* | 9/2016 | Mizuguchi | B60K 35/00 |

FOREIGN PATENT DOCUMENTS

| JP | 2002-225592 A | 8/2002 |
|---|---|---|
| JP | 2010126147 A | 6/2010 |
| JP | 4687521 B2 | 5/2011 |

* cited by examiner

FIG. 3

NOTIFICATION CONTROL INFORMATION 122

| IDENTIFIER | NOTIFICATION INFORMATION | OTHER-DISPLAY CONTROL | NOTIFICATION TERMINATION CONDITION | RELEASE CONDITION |
|---|---|---|---|---|
| 01 | WARNING: COLLISION | MUTE | VEHICLE SPEED IS PREDETERMINED SPEED OR LESS | BRAKING OPERATION OR OPERATION OF EASING UP ACCELERATOR |
| 02 | LANE DEVIATION | MUTE | 3 SECONDS AFTER AVOIDANCE OF LANE DEVIATION | NON-DETECTION OF LANE DEVIATION |
| 03 | WARNING: PEDESTRIAN COLLISION | DISPLAY SAME NOTIFICATION INFORMATION | 5 SECONDS AFTER NON-DETECTION OF PEDESTRIANS IN TRAVELING DIRECTION | 5 SECONDS AFTER NON-DETECTION OF PEDESTRIANS IN TRAVELING DIRECTION |
| ⋮ | ⋮ | ⋮ | ⋮ | ⋮ |

THIRD DISPLAY 100C

FIRST DISPLAY
100a

SECOND DISPLAY
100b

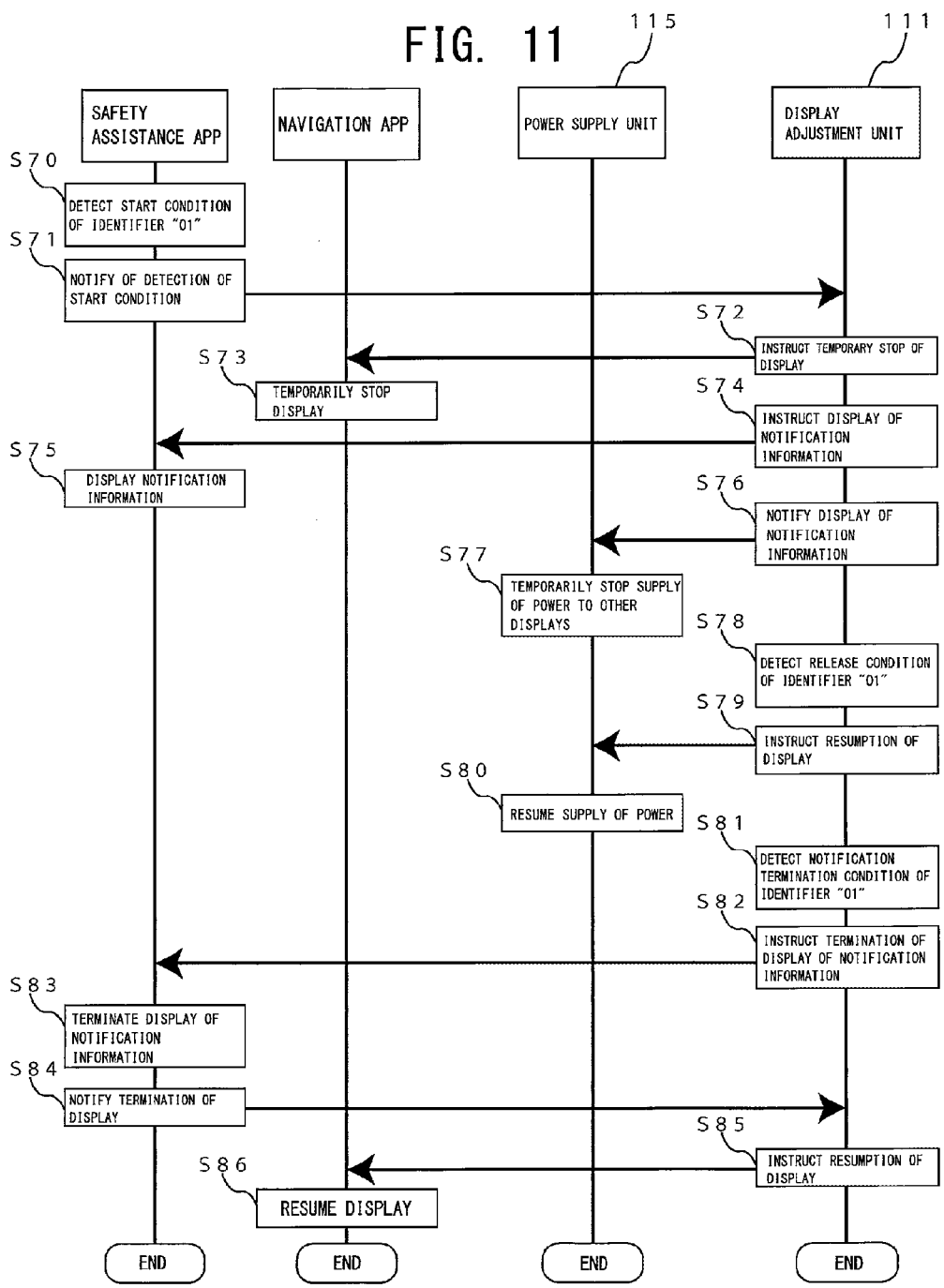

INFORMATION PRESENTATION DEVICE, INFORMATION PRESENTATION METHOD AND PROGRAM

TECHNICAL FIELD

The present invention relates to an information presentation device, an information presentation method, and a program. The present invention claims priority to Japanese Patent Application No. 2014-135828 filed on Jul. 1, 2014, the content of which is incorporated herein in its entirety by reference in designated states where incorporation by reference of literature is allowed.

BACKGROUND ART

In Patent Literature 1, there is disclosed a technology relating to a display device to be mounted on a vehicle, the display device "including: display means for displaying a message formed of characters, graphics, or images; visual line detection means for detecting a direction of a visual line of a user; and selection means for selecting, based on a detection result of the visual line, display means, to which the user is directing his or her visual line, as the display means for displaying the message from among a plurality of the display means".

CITATION LIST

Patent Literature

[PTL 1] Japanese Patent No. 4687521

SUMMARY OF INVENTION

Technical Problem

When there are plurality of displays inside a vehicle, a driver may distribute his or her attention to information displayed on each of the displays. In this case, even when a situation that requires the driver to be warned arises, e.g., when the vehicle is in danger of colliding with a vehicle in front thereof, and warning information is displayed on one of the displays, there is a risk in that the driver is paying his or her attention to another display, and does not visually recognize the warning sufficiently.

The technology disclosed in Patent Literature 1 does not solve the problem in that a driver may pay his or her attention to information other than the warning information displayed on a display. Further, the display position of the warning information is changed in accordance with the user's visual line, and hence there is a fear in that the driver may not be able to memorize the information and the display position in association with each other, resulting in confusion of the driver.

The present invention has been made in view of the above-mentioned points, and therefore has an object to provide a technology enabling efficient visual recognition of notification information by a user.

Solution to Problem

The present application includes a plurality of means for solving the above-mentioned problems, and an example thereof is as follows.

In order to solve the above-mentioned problems, according to one embodiment of the present invention, there is provided an information presentation device, including: a display adjustment unit configured to display, using processing information for displaying information based on a start condition, the information on a plurality of display areas; and a storage unit configured to store condition information, the condition information associating a predetermined start condition with notification information, the notification information being the information to be displayed when the predetermined start condition occurs. In the information presentation device, the display adjustment unit is configured to, when satisfaction of the predetermined start condition is detected: identify at least one of the plurality of display areas for displaying the notification information that is associated with the predetermined start condition in the storage unit; cause display of the notification information on the at least one of the plurality of display areas; and restrict display on other display areas other than the at least one of the plurality of display areas.

Advantageous Effects of Invention

According to the present invention, the technology enabling efficient visual recognition of the notification information by the user can be provided.

Problems, configurations, and effects other than those described above become apparent from the description of the following embodiments.

BRIEF DESCRIPTION OF DRAWINGS

FIG. 3 is a table for showing an example of notification control information.

FIG. 11 is a sequence diagram for illustrating an example of a flow of notification information display processing to be executed when satisfaction of a release condition is detected before that of a notification termination condition according to the second embodiment.

DESCRIPTION OF EMBODIMENTS

First Embodiment

Figure 1:
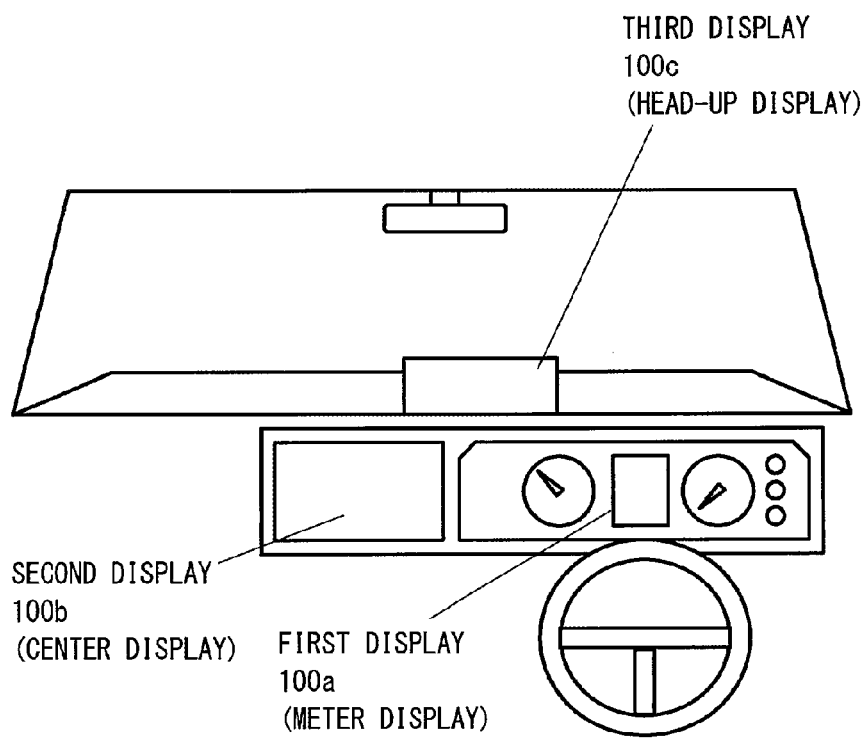
FIG. 1 is a diagram for illustrating an overview of display areas included in an information presentation device according to a first embodiment of the present invention.

In the following, a description is given of an example of an embodiment of the present invention with reference to the drawings. FIG. 1 is a diagram for illustrating an overview of display areas included in an information presentation device 1 according to a first embodiment of the present invention. The information presentation device 1 is, for example, a vehicle-mounted device, and includes a plurality of display areas. A first display 100a, a second display 100b, and a third display 100c illustrated in FIG. 1 are display areas included in the information presentation device 1.

For example, the first display 100a is a meter display, e.g., a liquid crystal display (LCD), installed on an instrument panel under a front windshield inside a vehicle. The second display 100b is a center display, and is installed on the instrument panel in the same manner as the first display 100a. In general, the first display 100a serving as a meter display is installed closer to a driver's seat than the second display 100b, but the installation position is not limited to this case.

The third display 100c is a head-up display, which is a display to be installed above the instrument panel. The third display 100c uses the front windshield as a display by, for example, projecting images onto the front windshield.

The information presentation device 1 is configured to display notification information on a predetermined display area that is as visually recognizable as possible by the driver when the information presentation device 1 detects a predetermined condition that requires the driver to be warned, e.g., when the vehicle is getting closer to a vehicle in front thereof during traveling. The driver mainly looks forward during driving, and thus notification information is displayed on the third display 100c, which is visually recognizable during driving.

In that case, display on other displays is temporarily stopped. With this, the driver is caused to concentrate on the notification information and visually recognize the notification information more efficiently. Even when the driver looks in a direction other than the forward direction, the driver's attention can be directed forward by displaying the notification information on the front display and temporarily stopping display on other displays.

In this embodiment, a description is given of a case in which the display areas included in the information presentation device 1 are implemented as a plurality of displays physically separated from one another, but the configuration of the display areas is not limited to this case. For example, one display may be divided to form a plurality of display areas.

Further, a display area for displaying the notification information is not limited to one display area. The same notification information may be displayed on each of a plurality of display areas, which is described in detail later. One example is that notification information including a character string of "lane deviation" is displayed on each of a plurality of display areas. Further, a plurality of display areas may be used to display one piece of notification information. One example is that, for example, when the third display 100c is divided into a left area and a right area to use those areas as two display areas, a character string of "lane" is displayed on the left display area and a character string of "deviation" is displayed on the right display area.

Figure 2:
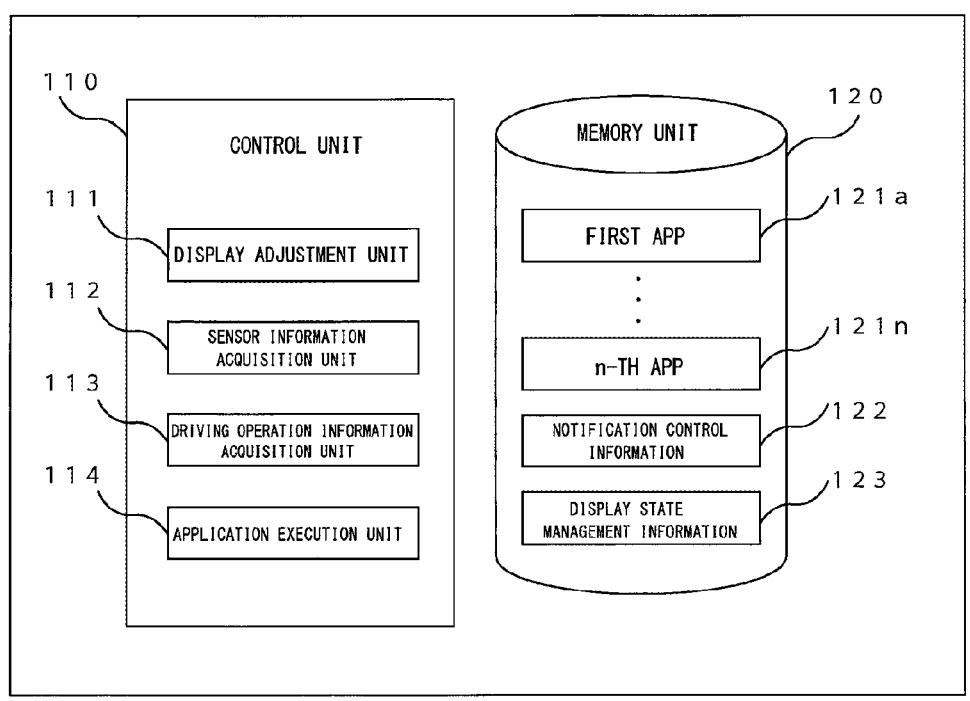
FIG. 2 is a diagram for illustrating an example of a functional block diagram of the information presentation device according to the first embodiment.

FIG. 2 is a diagram for illustrating an example of a functional block diagram of the information presentation device 1. The information presentation device 1 may be a vehicle-mounted device, or an electronic device, e.g., a personal computer (PC). The information presentation device 1 includes a control unit 110 and a memory unit 120.

The control unit 110 is configured to control, for example, display of notification information on a predetermined display, restriction of display on other displays, and resumption of display. The memory unit 120 is configured to store information necessary for processing of the control unit 110, and also store an application (hereinafter referred to as "app") 121, which is processing information to be executed on the information presentation device 1.

The control unit 110 includes a display adjustment unit 111, a sensor information acquisition unit 112, a driving operation information acquisition unit 113, and an application execution unit 114.

The display adjustment unit 111 is configured to control display of information on a plurality of displays. When satisfaction of a predetermined start condition is detected, the display adjustment unit 111 is configured to display of notification information on the third display 100c, and to restrict the display on other displays. Further, when satisfaction of a predetermined release condition is detected, the display adjustment unit 111 causes resumption of display on other displays. Further, when satisfaction of a predetermined notification termination condition is detected, the display adjustment unit 111 causes termination of display of the notification information, and returns display on the third display 100c to a state before the notification information was displayed, which is described in detail later.

The sensor information acquisition unit 112 is configured to acquire information on, for example, a distance between the vehicle and a vehicle in front thereof, information on lane deviation during traveling, and pedestrians around the vehicle based on information detected by a sensor of the vehicle installing the information presentation device 1. The driving operation information acquisition unit 113 is configured to acquire information on driving operation of the vehicle, such as a steering angle of a steering wheel included in the vehicle, depressing amounts of a brake pedal and an acceleration pedal, and a position of a shift lever.

The application execution unit 114 is configured to execute each app 121 stored in the memory unit 120 based on an input operation via an input device. For the sake of convenience, a description is given with the expression of the application execution unit 114 executing the app 121 stored in the memory unit 120. However, this expression has the same meaning as an expression of the app 121 being executed in accordance with a program forming the app 121. In the following, a description is given on the assumption that each app 121 executes processing in accordance with a program forming itself.

The memory unit 120 is configured to store the plurality of apps 121, notification control information 122, and display state management information 123. The memory unit 120 illustrated in FIG. 2 stores a first app 121a and an n-th app 121n as the apps 121. The number of apps 121 is not limited to two given above.

The app 121 includes a safety assistance app for detecting a start condition for giving a notification to the driver based on information detected by the sensor of the vehicle or information on driving operation, and displaying notification information on the third display 100c. The safety assistance app is configured to additionally perform control for assisting the driver in driving safely, e.g., display of a vehicle speed.

Further, the memory unit 120 may store, for example, a music app for playing a music or a navigation app for giving a route guidance for the vehicle as the app 121 additionally.

The notification control information 122 is information associating a start condition, a notification termination condition, and a release condition with one another for each piece of notification information. In this embodiment, a description is given on the assumption that the notification information is displayed on the third display 100c. However, the notification control information 122 may additionally contain information for identifying a display for displaying the notification information. In this case, the notification information is not necessarily displayed on the third display 100c, but displayed on a display that is associated with the notification information in the notification control information 122.

Also when one piece of notification information is displayed on a plurality of displays, the one piece of notification information, a plurality of displays for displaying the one piece of notification information, and (separated) pieces of the one piece of notification information to be displayed on respective displays are stored in advance in the notification control information 122 in a similar manner. The separated pieces of notification information are displayed on respective displays based on the notification control information 122, respectively.

The display state management information 123 is information associating pieces of information on the app 121 currently being displayed with one another for each display.

Next, a description is given of each piece of information stored in the memory unit 120.

FIG. 3 is a table for showing an example of the notification control information 122. The notification control information 122 includes an identifier 122a, notification information 122b, other-display control 122c, a notification termination condition 122d, and a release condition 122e.

The identifier 122a is identification information for identifying the notification control information 122. The notification information 122b is information for identifying information to be displayed on a display. The notification information 122b is, for example, a character string to be displayed on a display. The other-display control 122c is information indicating a method of controlling displays (hereinafter referred to as "other displays") other than a display for displaying notification information when the notification information is displayed.

The notification termination condition 122d is information for identifying a condition for terminating display of the notification information. The release condition 122e is information for identifying a condition for resuming display on other displays.

For example, the notification control information 122 identified by the identifier 122a of "02" among pieces of the notification control information 122 shown in FIG. 3 indicates that when the character string of "lane deviation", which is the notification information 122b, is displayed on the third display 100c, other displays are controlled in accordance with "mute" of the other-display control 122c. In other words, other displays are set to display nothing, and no information is displayed by the information presentation device 1.

After that, when a condition of "non-detection of lane deviation" is detected as the release condition 122e, display on other displays is resumed. Further, when a condition of "3 seconds after avoidance of lane deviation" is detected as the notification termination condition 122d, display of the notification information is terminated and display on the third display 100c is resumed.

Further, for example, the notification control information 122 identified by the identifier 122a of "03" indicates that when a character string of "warning: pedestrian collision", which is the notification information 122b, is displayed on the third display 100c, other displays are controlled in accordance with a method of "display same notification information" as the other-display control 122c. That is, the character string of "warning: pedestrian collision" is displayed on each of the other displays. After that, when the notification termination condition 122d and release condition 122e of "5 seconds after non-detection of pedestrians in traveling direction" is detected, display of the notification information is terminated and display on all the displays including the third display 100c is resumed.

Figure 4:
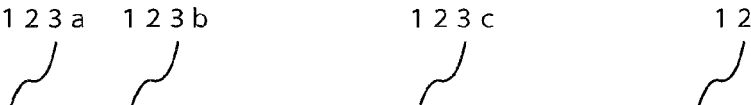
FIG. 4 is a table for showing an example of display state management information.

FIG. 4 is a table for showing an example of the display state management information 123. The display state management information 123 is information associating the app 121 currently being displayed with information being displayed for each display.

An identifier 123a is identification information for identifying the display state management information 123. The identifier 123a is independent of the identifier 122a of the notification control information 122. A display name 123b is identification information for identifying a display. A currently-displayed program 123c is information for identifying the app 121 that is a program being displayed on a display. Currently-displayed information 123d indicates information being displayed by the app 121 on a display.

The display state management information 123 shown in FIG. 4 associates a display, which is one display area, with one app 121, but the plurality of apps 121 may be associated with one display area. Further, when the currently-displayed program 123c and the currently-displayed information 123d are empty for the display name 123b, it is indicated that no information is presented by the information presentation device 1 on this display.

Figure 5:
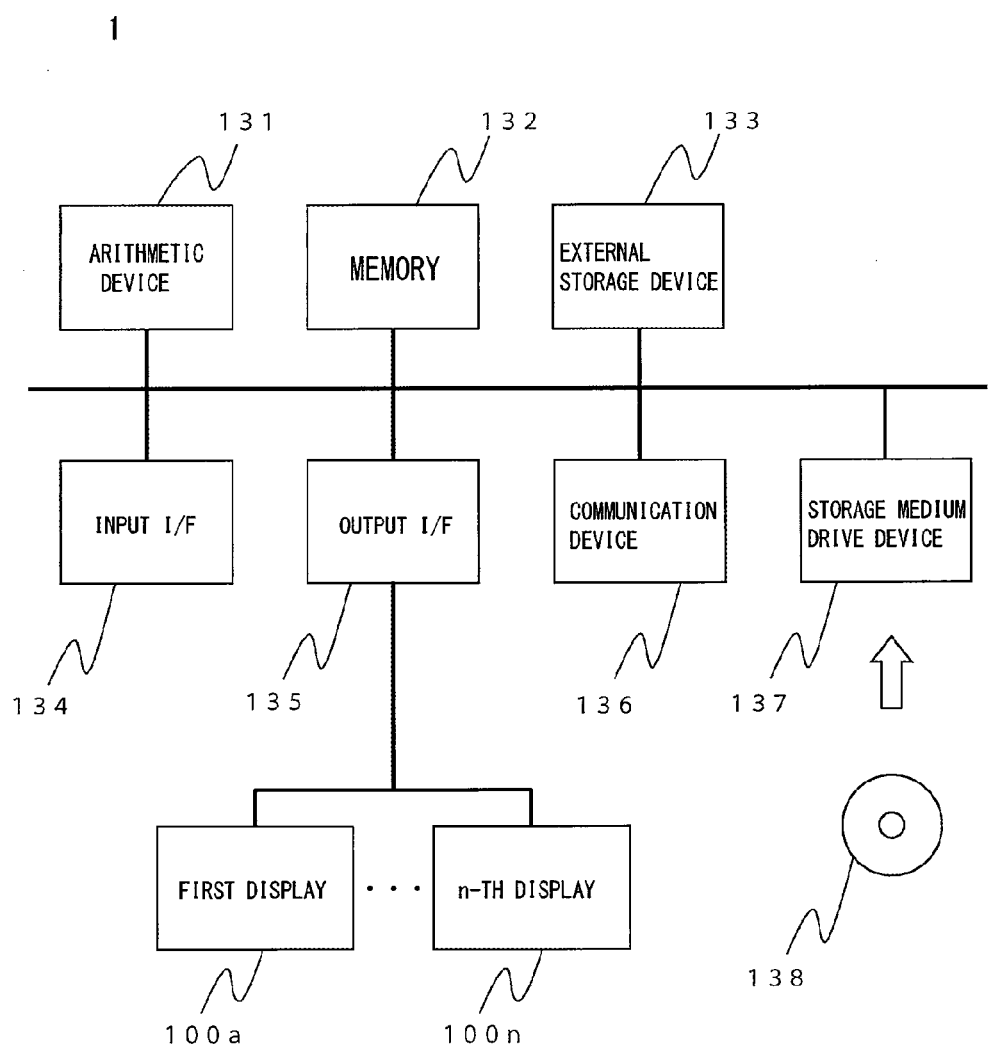
FIG. 5 is a diagram for illustrating a hardware configuration example of the information presentation device.

FIG. 5 is a diagram for illustrating a hardware configuration example of the information presentation device 1. The information presentation device 1 includes an arithmetic device 131, a memory 132, an external storage device 133, an input I/F (interface) 134, an output I/F 135, a communication device 136, a storage medium drive device 137, and a display 100, those components being connected to one another via a bus.

The arithmetic device 131 is a central processing unit, e.g., a CPU, and is configured to execute processing in accordance with a program stored in the memory 132 or the external storage device 133. Each of processing units forming the control unit 110 implements its function by the arithmetic device 131 executing a program.

The memory 132 is a memory device, e.g., a random access memory (RAM) and a flash memory, and is configured to function as a memory area into which a program or data is read out temporarily. The external storage device 133 is a storage medium capable of performing writing and reading, e.g., a hard disk drive (HDD).

The input I/F 134 is an interface configured to connect to an input device (not shown) that receives an input operation from a user including the driver, and the input I/F 134 receives an input from, for example, a touch panel and a microphone. Further, the input I/F 134 is configured to receive, from the vehicle to which the input I/F 134 is connected, an input of information on driving operation of the vehicle, such as a sensor included in the vehicle, a steering angle of a steering wheel, depressing amounts of a brake pedal and an acceleration pedal, and a position of a shift lever.

The output I/F 135 is an interface configured to output information to an output device, such as a display device including an LCD, and a speaker. The plurality of displays 100 serving as display areas are connected to the output I/F 135. The information presentation device 1 illustrated in FIG. 5 includes the plurality of displays 100 including the first display 100a and the n-th display 100n.

The communication device 136 is a device configured to connect the information presentation device 1 to a network, and is a communication device, e.g., a local area network (LAN) card. The storage medium drive device 137 is a device configured to input and output information from/to a portable medium 138, e.g., a compact disc (CD) and a digital versatile disc (DVD).

The function of the memory unit 120 is implemented by the memory 132 or the external storage device 133. Further, the function of the memory unit 120 may be implemented by a memory device on a network.

The processing of each component of the information presentation device 1 may be executed by a piece of hardware or by a plurality of pieces of hardware. Further, the processing of each component of the information presentation device 1 may be implemented by one program or by a plurality of programs.

For example, a portable electronic device with a communication function, e.g., a smartphone, may be used as the information presentation device 1, and the processing of this embodiment may be realized by the electronic device connecting to a plurality of displays via a network.

Figure 6:
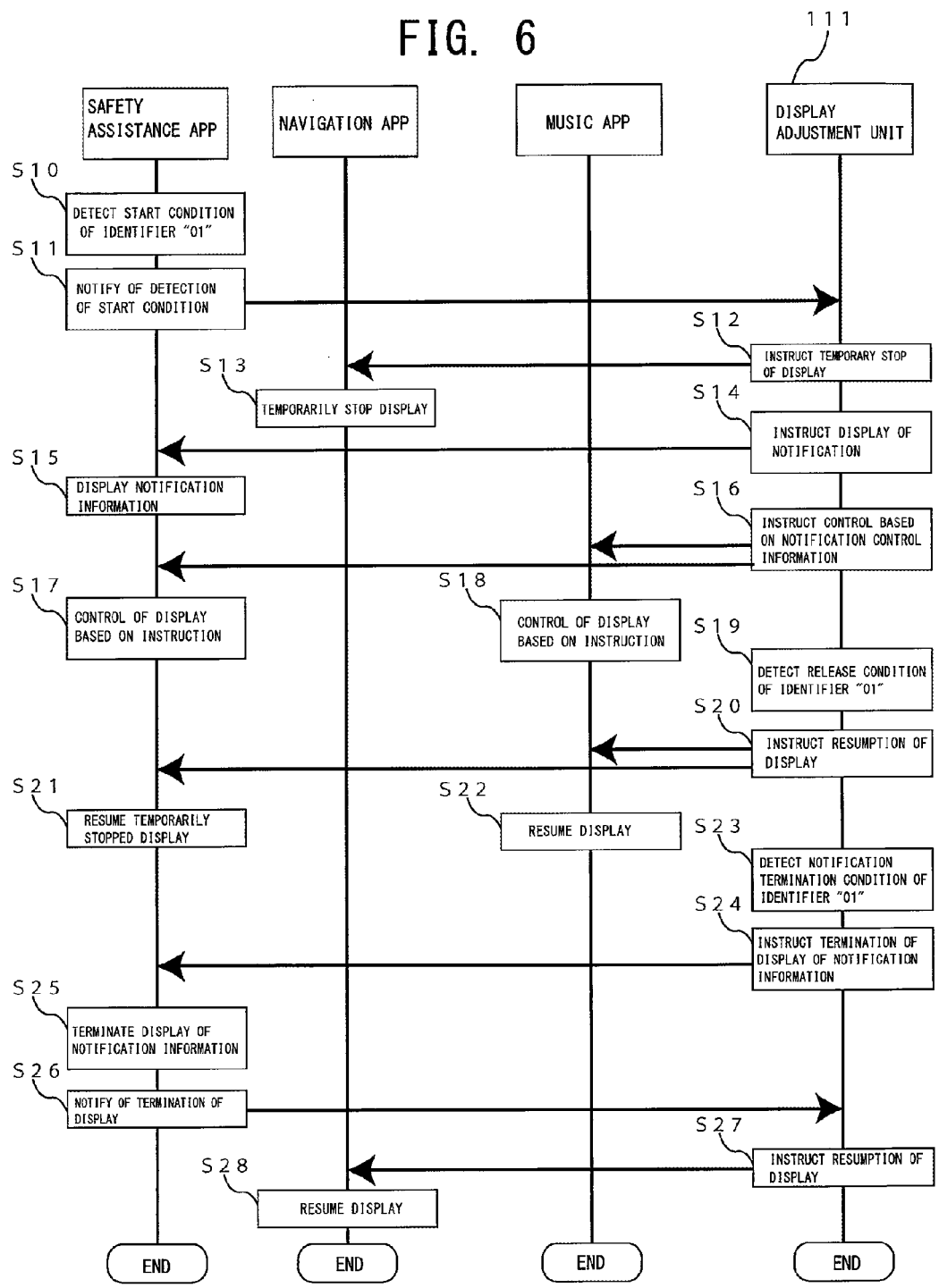
FIG. 6 is a sequence diagram for illustrating an example of a flow of notification information display processing to be executed when satisfaction of a release condition is detected before that of a notification termination condition.

FIG. 6 is a sequence diagram for illustrating an example of a flow of notification information display processing to be executed when satisfaction of a release condition is detected before that of a notification termination condition. Now, a description is given of processing to be executed from a state in which information is displayed on three displays by a music app, a safety assistance app, and a navigation app with reference to FIG. 6 and FIG. 8. The sensor information acquisition unit 112 and the driving operation information acquisition unit 113 acquire information on the traveling state of the vehicle, for example, periodically.

Further, in this sequence diagram, a description is given of a case in which satisfaction of a release condition for resuming display on a display is detected before that of a notification termination condition for terminating display of the notification information. A description is given later of a case in which satisfaction of the notification termination condition is detected at the same time as or before that of the release condition.

Figure 8A:
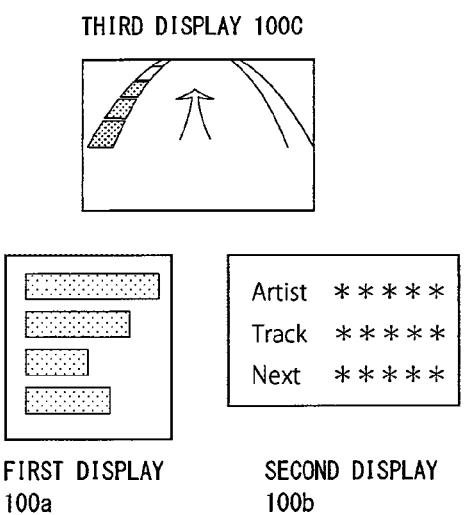
FIGS. 8(a), 8(b), and 8(c) are diagrams each for illustrating display examples of displays.

FIG. 8 are diagrams each for illustrating display examples of displays. FIG. 8(a) is a display example of each display before notification information display processing illustrated in FIG. 6 is started. A meter is displayed on the first display 100a by the safety assistance app, a title of a currently played music and the like are displayed on the second display 100b by the music app, and a traveling state is displayed on the third display 100c by the navigation app.

Referring back to FIG. 6 for description, the safety assistance app first detects a start condition of the identifier "01" (Step S10).

The safety assistance app refers to an area (not shown) of the memory unit 120, and detects a start condition of the notification information based on information acquired by the sensor information acquisition unit 112 or the driving operation information acquisition unit 113. Pieces of the notification information 122b stored in the notification control information 122 and start conditions for those pieces of notification information are stored in the memory unit 120. The safety assistance app detects satisfaction of a start condition for any piece of notification information stored in the memory unit 120 based on information acquired by the sensor information acquisition unit 112 and the driving operation information acquisition unit 113.

For example, the safety assistance app detects satisfaction of the start condition of the identifier "01" when the vehicle speed is a predetermined speed or more and the distance between the vehicle and an object in front thereof is a predetermined distance or less.

Next, the safety assistance app notifies the display adjustment unit 111 of the detection of the start condition (Step S11). The safety assistance app notifies the display adjustment unit 111 of the identifier for identifying notification information whose start condition is detected in Step S10.

Next, the display adjustment unit 111 instructs the navigation app to temporarily stop display (Step S12). Specifically, the display adjustment unit 111 identifies a display for displaying the notification information sent by the safety assistance app. The display adjustment unit 111 identifies a display for displaying the notification information sent by the safety assistance app as the third display 100c.

The display adjustment unit 111 refers to the display state management information 123 and identifies the currently-displayed program 123c, which is displaying information on the third display 100c. In this example, the navigation app is displaying information on the third display 100c. The display adjustment unit 111 instructs the navigation app to temporarily stop display. In the display state management information 123, the display adjustment unit 111 sets the currently-displayed program 123c and the currently-displayed information 123d associated with the third display 100c empty.

Next, the display adjustment unit 111 instructs the safety assistance app to display the notification information (Step S14). The display adjustment unit 111 uses the identifier sent in Step S11 to refer to the notification control information 122, and identifies the notification information 122b associated with this identifier. In FIG. 3, a character string of "warning: collision", which is the notification information 122b associated with the identifier "01" in the notification control information 122, is identified. The display adjustment unit 111 notifies the safety assistance app of a display instruction including the identified notification information. In the display state management information 123, the display adjustment unit 111 stores information identifying the safety assistance app into the currently-displayed program 123c associated with the third display 100c and stores the sent notification information into the currently-displayed information 123d.

Next, the safety assistance app displays the notification information on the third display 100c (Step S15).

Next, the display adjustment unit 111 gives an instruction to perform control based on the notification control information 122 (Step S16). Specifically, the display adjustment unit 111 refers to the other-display control 122c associated with the identifier sent in Step S11 to identify a method of controlling other displays. The display adjustment unit 111 gives an instruction for display control to the apps 121 displaying information on other displays based on the identified method of controlling other displays.

In the sequence diagram of FIG. 6, the start condition of the identifier "01" is detected in Step S11, and thus the display adjustment unit 111 identifies "mute", which is the other-display control 122c associated with the identifier "01" in the notification control information 122. The display adjustment unit 111 refers to the display state management information 123 to identify the music app and the safety assistance app, which are the currently-displayed programs 123c respectively displaying information on other displays, namely, the first display 100a and the second display 100b. The display adjustment unit 111 instructs the music app and the safety assistance app to temporarily stop display of information being displayed on the first display 100a and the second display 100b.

The display adjustment unit 111 sets the currently-displayed programs 123c and the currently-displayed information 123d associated with the first display 100a and the second display 100b empty in the display state management information 123. In this case, the display adjustment unit 111 stores the currently-displayed programs 123c, which are the apps 121 that have been displaying information on other displays, the currently-displayed information 123d, and the display names 123b in the display state management information 123 into a history storage area (not shown) of the memory unit 120.

The instruction in Step S16 may be executed prior to Step S12 or Step S14.

Next, the safety assistance app performs display control based on the instruction (Step S17). The safety assistance app temporarily stops display of the meter on the first display 100a based on the notification received from the display adjustment unit 111 in Step S16.

Similarly, the music app performs display control based on the instruction (Step S18). The music app temporarily stops display on the second display 100b.

Figure 8B:
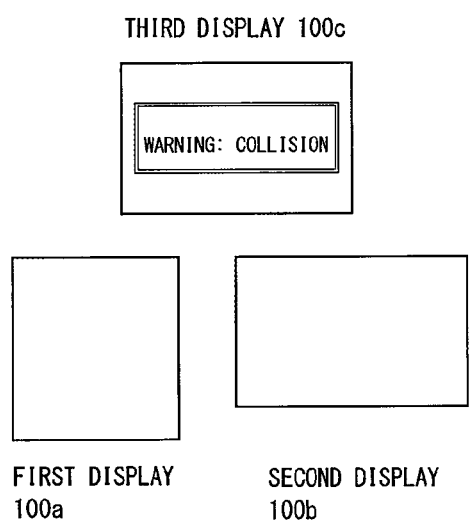

FIG. 8(b) is a display example of each display under a state in which processing based on the instruction to display the notification information and the instruction to temporarily stop display on other displays given by the display adjustment unit 111 is executed. The character string of "warning: collision", which is the notification information, is displayed on the third display 100c by the safety assistance app. Further, display on the first display 100a and the second display 100b is temporarily stopped based on the instruction to temporarily stop display given by the display adjustment unit 111.

Next, the display adjustment unit 111 detects a release condition of the identifier "01" (Step S19). The display adjustment unit 111 detects, based on information acquired by the sensor information acquisition unit 112 and the driving operation information acquisition unit 113, satisfaction of a condition of "braking operation or operation of easing up accelerator", which is the release condition 122e associated with the identifier "01" in the notification control information 122.

Next, the display adjustment unit 111 instructs resumption of display on other displays (Step S20). Specifically, the display adjustment unit 111 refers to the history storage area having stored information in Step S16 to identify the apps 121 that had been displaying information on other displays before the temporary stop of display. The display adjustment unit 111 identifies the safety assistance app and the music app as the apps 121 that had been displaying information on the first display 100a and the second display 100b, which are other displays. The display adjustment unit 111 instructs the identified safety assistance app and music app to resume display.

The display adjustment unit 111 uses the information stored in the history storage area to associate the currently-displayed program 123c and the currently-displayed information 123d with the first display 100a and the second display 100b, and updates the display state management information 123.

Next, the safety assistance app resumes display on the first display 100a based on the received display resumption instruction (Step S21).

Similarly, the music app resumes display of information on the second display 100b based on the received display resumption instruction (Step S22).

Figure 8C:
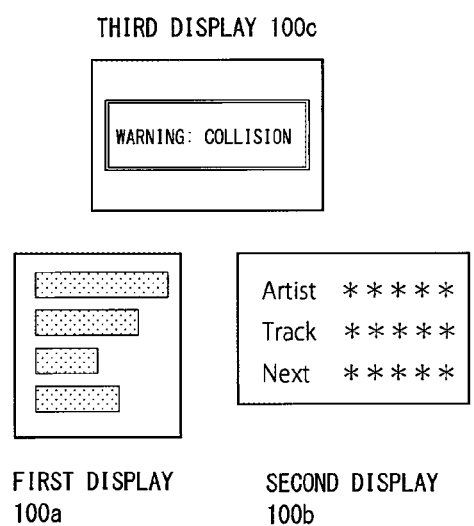

FIG. 8(c) is a display example of each display under a state in which processing based on detection of satisfaction of the release condition is executed. The meter is displayed on the first display 100a by the safety assistance app. The title of the currently played music is displayed on the second display 100b by the music app. The notification information is continuously displayed on the third display 100c by the safety assistance app.

Referring back to FIG. 6 for description, the display adjustment unit 111 next detects the notification termination condition of the identifier "01" (Step S23). The display adjustment unit 111 identifies a condition of "vehicle speed is predetermined speed or less" as a notification termination condition 123e associated with the identifier "01" in the notification control information 122. When the display adjustment unit 111 detects that the vehicle speed is a predetermined speed or less based on the information acquired by the sensor information acquisition unit 112 and the driving operation information acquisition unit 113, the display adjustment unit 111 determines that satisfaction of the notification termination condition is detected.

Next, the display adjustment unit 111 instructs the safety assistance app to terminate display of the notification information (Step S24). The display adjustment unit 111 sets the currently-displayed program 123c and the currently-displayed information 123d associated with the third display 100c displaying the notification information empty in the display state management information 123.

Next, the safety assistance app terminates display of the notification information (Step S25).

Next, the safety assistance app notifies the display adjustment unit 111 of the termination of display of the notification information (Step S26).

Next, the display adjustment unit 111 instructs the navigation app to resume display (Step S27). When the safety assistance app notifies the display adjustment unit 111 that the safety assistance app has terminated display in Step S26, the display adjustment unit 111 refers to a history storage area of the memory unit 120, and identifies the app 121 that had been displaying information before the notification information was displayed and the currently-displayed information with respect to the third display 100c, which has been displaying the notification information. The display adjustment unit 111 instructs the app 121 that had been displaying information before the notification information was displayed to resume display of the identified currently-displayed information.

Next, the navigation app displays the currently-displayed information sent in Step S27 on the third display 100c, which has been displaying the notification information (Step S28). As a result, as illustrated in FIG. 8(a), the safety assistance app, the music app, and the navigation app again perform display on the first display 100a, the second display 100b, and the third display 100c, respectively.

After that, each app 121 and the display adjustment unit 111 terminate processing of this sequence diagram.

Figure 7:
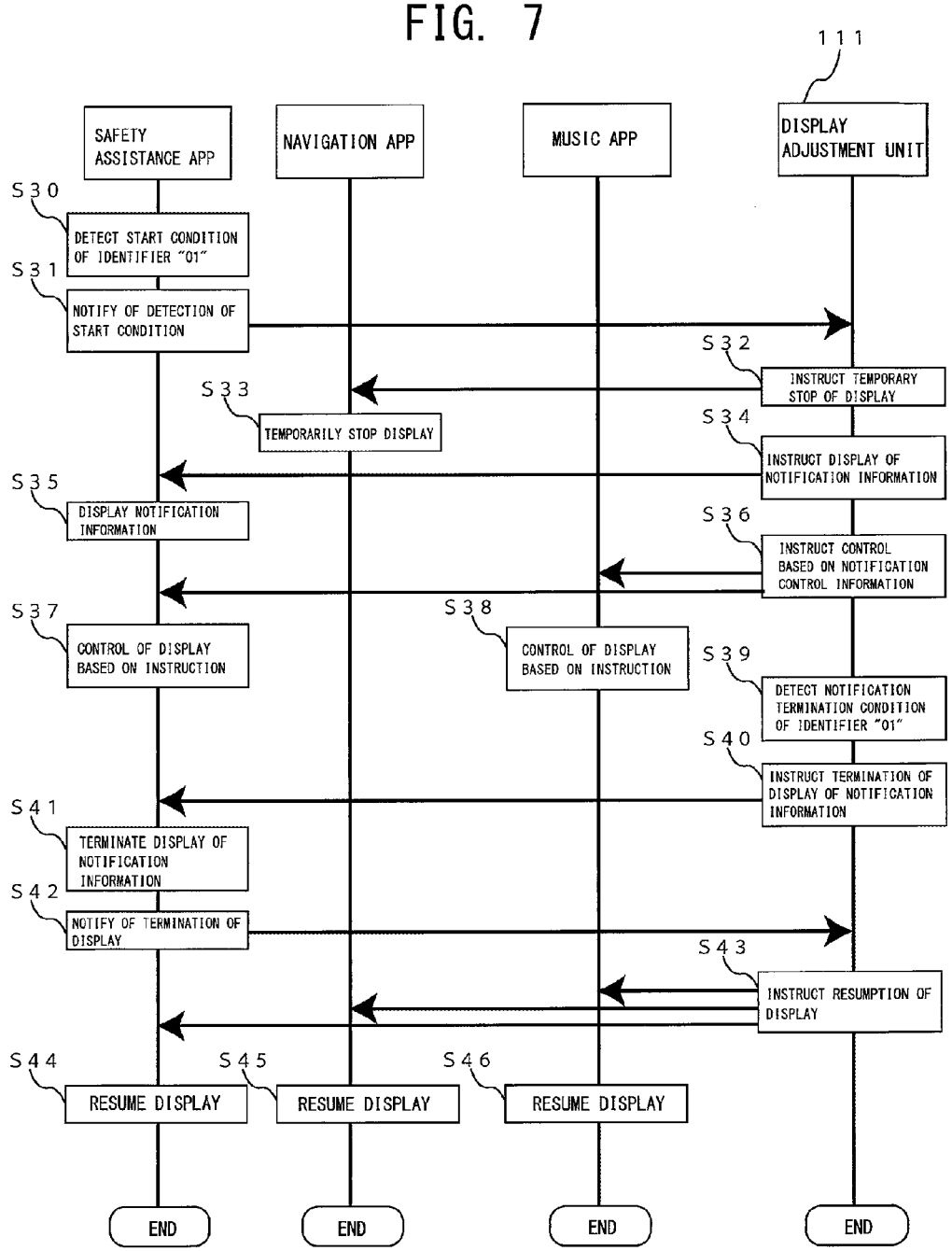
FIG. 7 is a sequence diagram for illustrating an example of a flow of notification information display processing to be executed when satisfaction of the notification termination condition is detected at the same time or before that of the release condition.

FIG. 7 is a sequence diagram for illustrating an example of a flow of notification information display processing to be executed when satisfaction of the notification termination condition is detected at the same time as or before that of the release condition. When the display adjustment unit 111 detects satisfaction of the notification termination condition at the same time as or before that of the release condition, the display adjustment unit 111 causes termination of display of the notification information and resumption of display on other displays.

First, the safety assistance app detects the start condition of the identifier "01" (Step S30). The processing to be executed from Step S30 to Step S38 is similar to that from Step S10 to Step S18, and thus a description thereof is omitted here.

Next, the display adjustment unit 111 detects satisfaction of the notification termination condition of the identifier "01" (Step S39). The processing to be executed from Step S39 to Step S42 is similar to that from Step S23 to Step S26.

Next, the display adjustment unit 111 instructs the safety assistance app, the navigation app, and the music app to resume display (Step S43). The display adjustment unit 111 refers to the history storage area of the memory unit 120, and identifies each app 121 that had been displaying information before the notification information was displayed or before display of the information was temporarily stopped with respect to each display included in the information presentation device 1. The display adjustment unit 111 instructs each app 121 to display the currently-displayed information stored in the history storage area.

Next, the safety assistance app resumes display of information on the first display 100a based on the instruction from the display adjustment unit 111 (Step S44). The processing to be executed in Step S44 and Step S46 is similar to that in Step S21 and Step S22. Further, the processing to be executed in Step S43 is similar to that in Step S27. The processing from Step S44 to Step S46 may be executed in any order. After that, the safety assistance app, the navigation app, the music app, and the display adjustment unit 111 end the processing of this sequence diagram.

It should be additionally remarked that when the display adjustment unit 111 detects satisfaction of the notification termination condition before that of the release condition in Step S39, the display adjustment unit 111 causes resumption of display of information on other displays without waiting for detection of satisfaction of the release condition.

In some cases, any one of the notification termination condition 122d and the release condition 122e may be set to the notification control information 122. In this case, when the display adjustment unit 111 detects satisfaction of this condition, the display adjustment unit 111 causes termination of display of the notification information and resumption of display of information on other displays.

Further, during display of one piece of notification information, when the safety assistance app additionally detects satisfaction of a start condition of another piece of notification information, the display adjustment unit 111 instructs the safety assistance app to terminate display of the one piece of notification information being displayed, and to display the another piece of notification information relating to the newly detected start condition.

It should be additionally remarked that a priority may be associated with each piece of notification information in the notification control information 122 shown in FIG. 3. In this case, the display adjustment unit 111 compares a priority of a piece of notification information being displayed to a priority of another piece of notification information whose start condition is newly detected, and allows one of those pieces of notification information having a higher priority to be displayed on a predetermined display. In this case, the display adjustment unit 111 causes termination of display of notification information or resumption of display on other displays based on the notification information being displayed, and the notification termination condition 122d and the release condition 122e associated with each other in the notification control information 122.

Further, in this embodiment, the display adjustment unit 111 is configured to detect satisfaction of a release condition or a notification termination condition based on information acquired by the sensor information acquisition unit 112 and the driving operation information acquisition unit 113. However, it is possible to set, as a release condition or a notification termination condition, a condition that is not related to a driving operation, e.g., a condition of "5 seconds after display of notification information". In this case, the display adjustment unit 111 can detect satisfaction of a release condition or a notification termination condition without using information acquired by the sensor information acquisition unit 112 or the driving operation information acquisition unit 113.

In this embodiment, when a situation that requires the driver to be warned arises, the driver's attention is concentrated on the notification information, and hence it is possible to warn the driver more reliably. Further, through individual determination of the release condition and the notification termination condition, it is possible to resume display on other displays and at the same time to continue display of the notification information. With this, when an emergency is avoided, it is possible to give information to the driver with use of another display and at the same time to allow the driver to check the notification information. For example, this configuration is useful for a case in which the driver overlooked the notification information, or for a case in which the driver wishes to check the notification information when the driver gets relaxed during driving.

Further, when satisfaction of the notification termination condition is detected before that of the release condition, display of the notification information is terminated and display on each display is returned to a state before the notification information was displayed, to thereby avoid a situation in which nothing is displayed on the displays and allow the driver to always refer to display on any one of the displays.

Note that, in order to utilize the benefit of delaying termination of display of the notification information compared to resumption of display on other displays, it is desired that the notification control information 122 be set such that satisfaction of the release condition 122e is detected before that of the notification termination condition 122d by setting, for example, the release condition 122e as a condition of "3 seconds after start of display of notification information" and the notification termination condition 122d as a condition of "5 seconds after start of display of notification information".

First Modified Example

Next, a first modified example of the present invention is described. In the embodiment described above, the display adjustment unit 111 is configured to detect satisfaction of a notification termination condition. In this modified example, the display adjustment unit 111 is configured to notify the safety assistance app of a notification termination condition when giving an instruction to display notification information, and the safety assistance app detects satisfaction of the notification termination condition. In the following, a description is given of differences with the embodiment described above, and a description of overlapping points is omitted here.

Figure 9:
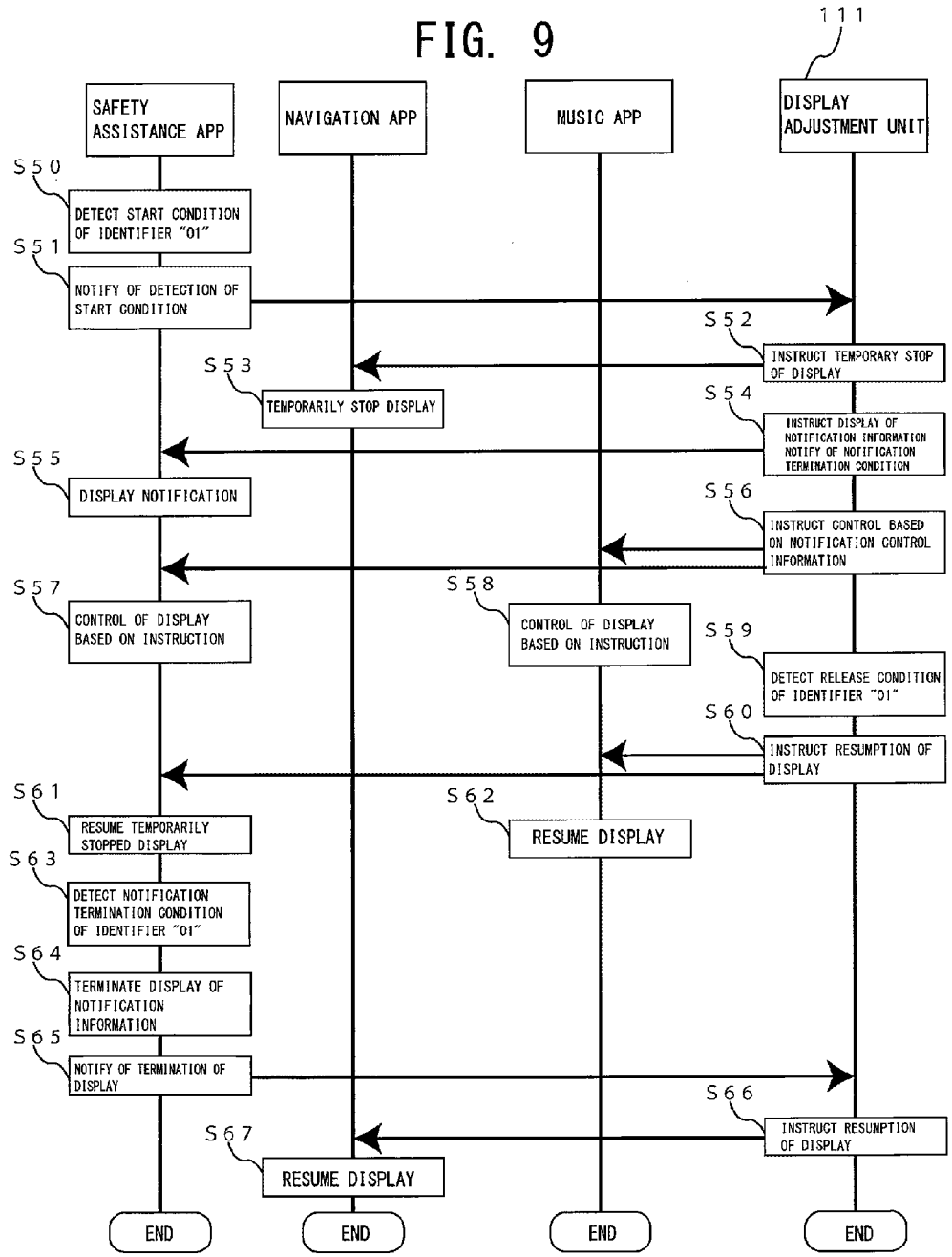
FIG. 9 is a sequence diagram for illustrating an example of a flow of notification information display processing to be executed when satisfaction of a release condition is detected before that of a notification termination condition according to a first modified example of the present invention.

FIG. 9 is a sequence diagram for illustrating an example of a flow of notification information display processing to be executed when satisfaction of a release condition is detected before that of a notification termination condition according to the first modified example.

First, the safety assistance app detects the start condition of the identifier "01" (Step S50). The processing to be executed from Step S50 to Step S53 is similar to that from Step S10 to Step S13, and thus a description thereof is omitted here.

Next, the display adjustment unit 111 instructs the safety assistance app to display the notification information and at the same time notifies the safety assistance app of a notification termination condition of the notification information (Step S54). Specifically, the display adjustment unit 111 uses the identifier sent in Step S51 to refer to the notification control information 122, and identifies the notification information 122b and the notification termination condition 122d associated with this identifier. The display adjustment unit 111 notifies the safety assistance app of the identified notification information 122b and notification termination condition 122d. Further, in the display state management information 123, the display adjustment unit 111 stores information identifying the safety assistance app into the currently-displayed program 123c associated with the third display 100c and stores the sent notification information into the currently-displayed information 123d.

Next, the safety assistance app displays the notification information (Step S55). The processing to be executed from Step S55 to Step S62 is similar to that from Step S15 to Step S22, and thus a description thereof is omitted here.

Next, the safety assistance app detects satisfaction of the notification termination condition of the identifier "01" (Step S63). The safety assistance app detects satisfaction of the notification termination condition received from the display adjustment unit 111 in Step S54 based on information acquired by the sensor information acquisition unit 112 and the driving operation information acquisition unit 113.

Next, the safety assistance app terminates display of the notification information (Step S64). The processing to be executed from Step S64 to Step S67 is similar to that from Step S25 to Step S28, and thus a description thereof is omitted here. After that, the safety assistance app, the navigation app, the music app, and the display adjustment unit 111 end the processing of this sequence diagram.

When the display adjustment unit 111 is notified (Step S65) of termination of display of the notification information by the safety assistance app before detection of the release condition in Step S59, the display adjustment unit 111 determines satisfaction of the notification termination condition as being detected before satisfaction of the release condition, and notifies each app 121 of an instruction to resume display on another display. With this, it is possible to prevent a situation in which no information is displayed on other displays although display of the notification information is terminated.

Further, the modified example is similar to the embodiment described above in that through setting of a condition that is not related to a driving operation as the notification termination condition, it is possible to detect satisfaction of the release condition or the notification termination condition without using information acquired by the sensor information acquisition unit 112 or the driving operation information acquisition unit 113. Further, it is also possible for the safety assistance app to detect, by referring to the notification control information 122, satisfaction of the notification termination condition and terminate display of the notification information even when the safety assistance app is not notified of the notification termination condition by the display adjustment unit 111.

Further, each app 121 may be notified of the release condition in advance similarly to the notification of the notification termination condition to the safety assistance app. In this case, the app 121 that has received the notification detects satisfaction of the release condition.

Through setting of a flag in the notification control information 122, it is also possible to perform control such that the display adjustment unit 111 detects satisfaction of notification termination conditions for predetermined pieces of notification information and the safety assistance app detects satisfaction of notification termination conditions for other pieces of notification information.

Second Modified Example

Next, a second modified example of the present invention is described. In the embodiment described above, after notification information is displayed, display of the notification information and display on other displays are both achieved through use of a notification termination condition and a release condition (e.g., FIG. 8(c)). In this modified example, this mode of the embodiment described above is referred to as "normal mode", and in addition, there are given "Mode A", which is a mode of terminating display of the notification information earlier than the normal mode, and "Mode B", which is a mode of delaying a start timing of display on other displays compared to the normal mode. In the following, differences with the embodiment described above are described.

The user can select one from "normal mode", "Mode A", and "Mode B" in advance. The selection is performed based on an input via the input I/F 134. The processing to be performed when "normal mode" is selected is similar to that in the embodiment described above.

As described above, in order to utilize the benefit of delaying termination of display of the notification information compared to resumption of display on other displays, it is desired that the notification control information 122 be set such that satisfaction of the release condition 122e is detected before that of the notification termination condition 122d.

Also when "Mode A" is selected, the notification information is displayed on the third display 100c through satisfaction of a start condition of the notification information. After that, when satisfaction of the release condition is detected, display on other displays is resumed. The second modified example is different from the embodiment described above in that, at that time, display of the notification information is terminated and information that had been displayed before the notification information was displayed is displayed also on the third display 100c. Note that, satisfaction of the notification termination condition does not affect display states of the displays. As a result, display of the notification information is terminated at a timing earlier than that of the normal mode because display of the notification information is terminated without waiting for satisfaction of the notification termination condition.

When "Mode B" is selected, satisfaction of the release condition relating to the notification information being displayed does not affect display states of the displays. When satisfaction of the notification termination condition is detected, display of the notification information is terminated and display on other displays is resumed. As a result, display on other displays is resumed at timing later than that of the normal mode.

"Mode A" and "Mode B" are common in that those modes do not allow both of display of the notification information and display on other displays, and when a predetermined condition is satisfied, terminate display of the notification information and resume display on other displays. The timing of display switch on the displays becomes later in "Mode B" than in "Mode A" by setting satisfaction of the notification termination condition to be later than that of the release condition.

In this modified example, it is possible to perform display that meets the need of the user by receiving a selection by the user as to the termination timing of display of the notification information and the start timing of display on other displays, to thereby improve the utility.

Second Embodiment

Next, a second embodiment of the present invention is described.

Figure 10:
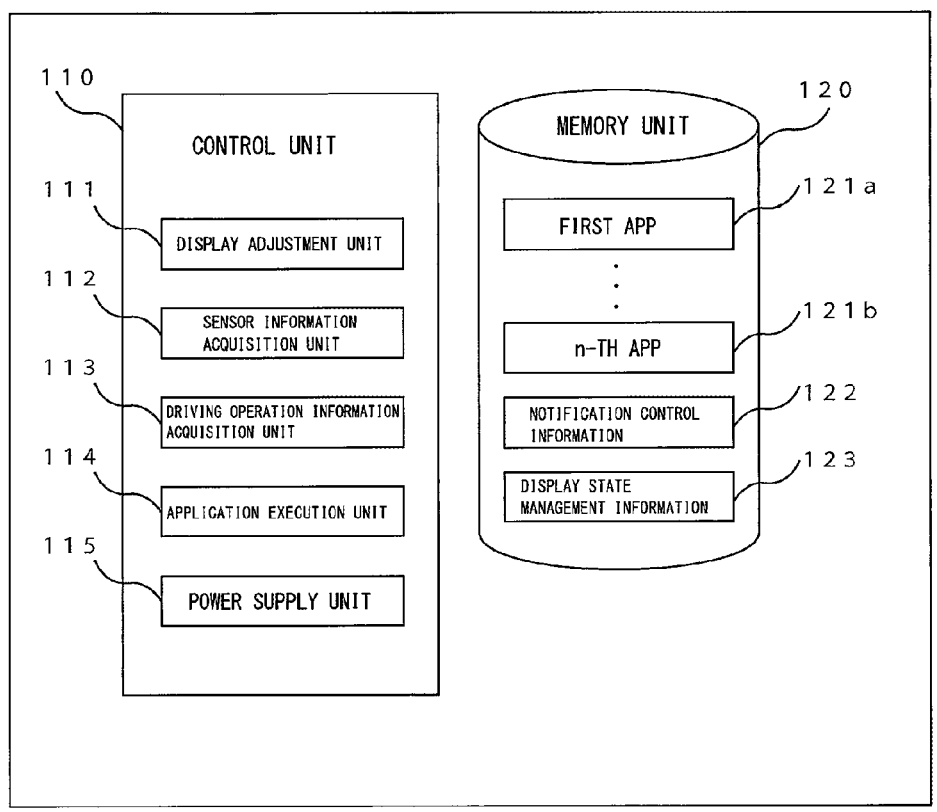
FIG. 10 is a diagram for illustrating an example of a functional block diagram of an information presentation device 1 according to a second embodiment of the present invention.

FIG. 10 is a diagram for illustrating an example of a functional block diagram of the information presentation device 1 according to the second embodiment. In the embodiment described above, the display adjustment unit 111 instructs the apps 121 displaying information on other displays to temporarily stop the display, to thereby set other displays to display nothing when the notification information is displayed. In this embodiment, other displays are set to display nothing when the notification information is displayed by temporarily stopping supply of power to the other displays. In the following, differences with the embodiment described above are described, and a description of overlapping points is omitted here.

The control unit 110 of the information presentation device 1 includes a power supply unit 115 in addition to the display adjustment unit 111, the sensor information acquisition unit 112, the driving operation information acquisition unit 113, and the application execution unit 114.

The power supply unit 115 is configured to control supply of power to respective displays included in the information presentation device 1. When the power supply unit 115 temporarily stops supply of power to a specific display, the information of the app 121 is not displayed on the display and the display is set to display nothing.

FIG. 11 is a sequence diagram for illustrating an example of a flow of notification information display processing to be executed when satisfaction of a release condition is detected before that of a notification termination condition according to the second embodiment.

First, the safety assistance app detects satisfaction of a start condition of notification information of the identifier "01" (Step S70). The processing to be executed from Step S70 to Step S75 is similar to that from Step S10 to Step S15, and thus a description thereof is omitted here.

Next, the display adjustment unit 111 notifies the power supply unit 115 of the fact that the notification information is displayed (Step S76). At that time, the display adjustment unit 111 may notify of information identifying the display displaying the notification information as well.

In the display state management information 123, the display adjustment unit 111 stores information indicating that supply of power is temporarily stopped into the currently-displayed programs 123c associated with the display names 123b, which correspond to other displays. Further, the display adjustment unit 111 stores information on the display state management information 123 before the supply of power is temporarily stopped into the history storage area of the memory unit 120.

Next, the power supply unit 115 temporarily stops supply of power to other displays (Step S77). As a result, display on other displays is temporarily stopped.

Next, the display adjustment unit 111 detects the release condition of the identifier "01" (Step S78). The processing to be executed in Step S78 is similar to that in Step S19.

Next, the display adjustment unit 111 instructs the power supply unit 115 to resume display (Step S79). The display adjustment unit 111 uses the information stored in the history storage area to store information on the apps 121 for which display is to be resumed into the display state management information 123.

Next, the power supply unit 115 resumes supply of power to other displays to which supply of power has been temporarily stopped (Step S80). As a result, display on other displays is resumed.

Next, the display adjustment unit 111 detects the notification termination condition of the identifier "01" (Step S81). The processing to be executed from Step S81 to Step S86 is similar to that from Step S23 to Step S28, and thus a description thereof is omitted here. After that, the safety assistance app, the navigation app, the power supply unit 115, and the display adjustment unit 111 end the processing of this sequence diagram.

This sequence diagram is a diagram for illustrating a case in which satisfaction of a release condition is detected before that of a notification termination condition. When satisfaction of a notification termination condition is detected before that of a release condition, the sequence is executed in a manner similar to that of the first embodiment. That is, when the display adjustment unit 111 detects satisfaction of a notification termination condition before that of a release condition, the display adjustment unit 111 notifies the safety assistance app of an instruction to terminate display of the notification information, and notifies the power supply unit 115 so that the power supply unit 115 resumes supply of power to other displays. As a result, display of information on each display is resumed irrespective of whether or not the release condition is satisfied.

In this embodiment, it is possible to reliably cause other displays to display nothing by temporarily stopping supply of power without the apps 121, which are displaying information on other displays, executing display temporary stop processing. That is, it is possible to cause the driver to pay attention to the notification information more reliably.

Respective embodiments and modified examples according to the present invention have been described above, but the present invention is not limited to the exemplary embodiments described above and includes various modified examples. For example, the exemplary embodiments described above are described in detail to facilitate understanding of the present invention, and the present invention is not limited to the one including all the configurations described above. Further, a part of a configuration of an exemplary embodiment may be replaced with a configuration of another exemplary embodiment. Further, a configuration of an exemplary embodiment may be added to a configuration of another exemplary embodiment. Further, another configuration may be added to, deleted from, or replaced with a part of a configuration of each exemplary embodiment. Further, a part or all of each configuration, function, processing unit, processing means, and the like described above may be implemented by hardware, e.g., by designing with an integrated circuit. Further, control lines and information lines illustrated in the figures are the ones considered to be necessary for description, and all the lines are not necessarily illustrated. Almost all the components may be considered as being connected to one another.

Further, the functional configuration of the information presentation device 1 is the one classified in accordance with major processing specifics to facilitate understanding of the configuration. The present invention is not limited by a manner or a name of classification of components. The configuration of the information presentation device 1 may be classified into a larger number of components depending on processing specifics. Further, classification may be made so that one component executes a larger number of processing operations.

REFERENCE SIGNS LIST

1: information presentation device, 100: display, 110: control unit, 111: display adjustment unit, 112: sensor information acquisition unit, 113: driving operation information acquisition unit, 114: application execution unit, 115: power supply unit, 120: memory unit, 121: application, 122: notification control information, 123: display state management information, 131: arithmetic device, 132: memory, 133: external storage device, 134: input I/F, 135: output I/F, 136: communication device, 137: storage medium drive device, 138: medium

The invention claimed is:

1. An information presentation device, comprising:
    a display adjustment unit configured to display, using processing information for displaying information based on a start condition, the information on a plurality of display areas; and
    a storage unit configured to store condition information, the condition information associating a predetermined start condition with notification information, the notification information being the information to be displayed when the predetermined start condition occurs,
    wherein the display adjustment unit is configured to, when satisfaction of the predetermined start condition is detected:
    identify at least one of the plurality of display areas for displaying the notification information that is associated with the predetermined start condition in the storage unit;
    cause display of the notification information on the at least one of the plurality of display areas; and
    restrict display on other display areas other than the at least one of the plurality of display areas.

2. An information presentation device according to claim 1, wherein:
    the condition information associates the predetermined start condition with a termination condition; and
    the display adjustment unit is configured to, when satisfaction of the termination condition that is associated with the predetermined start condition is detected after the predetermined start condition is satisfied:
    cause termination of display of the notification information that is associated with the predetermined start condition; and
    cause, using the processing information that allowed the information to be displayed before the predetermined start condition was satisfied, resumption of display for each of the plurality of display areas.

3. An information presentation device according to claim 1, further comprising safety assistance processing information, which is processing information for displaying the notification information based on a display instruction sent by the display adjustment unit, wherein:
    the display adjustment unit is configured to, when receiving from the safety assistance processing information a notification that satisfaction of the predetermined start condition is detected, notify the safety assistance processing information of the display instruction of displaying the notification information that is associated with the start condition; and
    the safety assistance processing information is configured to detect satisfaction of the predetermined start condition, and notify the display adjustment unit of the satisfaction.

4. An information presentation device according to claim 3, wherein:
    the condition information associates, as the termination condition, a first termination condition for terminating display of the notification information and a second termination condition for resuming display on the other display areas with the predetermined start condition; and
    the display adjustment unit is configured to, after the predetermined start condition is satisfied:
    cause, when satisfaction of the first termination condition is detected, termination of display of the notification information using the safety assistance processing information, and cause display of the information on the at least one of the plurality of display areas, which are displaying the notification information, using the processing information that allowed the information to be displayed before the predetermined start condition was satisfied; and
    cause, when satisfaction of the second termination condition is detected, display of the information using the processing information that allowed the information to be displayed on the other display areas before the predetermined start condition was satisfied.

5. An information presentation device according to claim 4, wherein the display adjustment unit is configured to, when satisfaction of the first termination condition is detected before satisfaction of the second termination condition is detected, cause the safety assistance processing information to terminate display of the notification information, and cause display of the information on each of the at least one of the plurality of display areas using the processing information that allowed the information to be displayed before the predetermined start condition was satisfied.

6. An information presentation device according to claim 4, wherein the display adjustment unit is configured to receive selection of any one of modes, the modes comprising:
    a first mode for terminating display of the notification information and displaying the information on each of the at least one of the plurality of display areas using the first termination condition and the second termination condition;
    a second mode for terminating, when satisfaction of the first termination condition is detected, display of the notification information and displaying the information on each of the at least one of the plurality of display areas; and
    a third mode for terminating, when satisfaction of the second termination condition is detected, display of the notification information and displaying the information on each of the at least one of the plurality of display areas.

7. An information presentation device according to claim 3, wherein:
   the display adjustment unit is configured to, when receiving from the safety assistance processing information the notification that satisfaction of the predetermined start condition is detected, notify the safety assistance processing information of the termination condition for terminating display of the notification information together with the display instruction; and
   the safety assistance processing information is configured to, when detecting satisfaction of the termination condition after satisfaction of the predetermined start condition is detected, terminate display of the notification information.

8. An information presentation device according to claim 1, further comprising a power supply control unit configured to supply power to each of the plurality of display areas, wherein:
   the display adjustment unit is configured to, when satisfaction of the predetermined start condition is detected, give a notification to the power supply control unit; and
   the power supply control unit is configured to, when receiving the notification, temporarily stop supply of power to the other display areas.

9. An information presentation device according to claim 1, wherein:
   the plurality of display areas each comprise a display for a vehicle including a head-up display; and
   the display adjustment unit is configured to, when satisfaction of the predetermined start condition is detected, cause display of the notification information on the head-up display.

10. An information presentation method, comprising procedures of:
   displaying, using processing information for displaying information based on a start condition, the information on a plurality of display areas;
   detecting satisfaction of a predetermined start condition; and
   performing, when satisfaction of the predetermined start condition is detected in the detecting procedure, display adjustment comprising:
   identifying the predetermined start condition and at least one of the plurality of display areas for displaying notification information, the notification information being the information to be displayed when the predetermined start condition occurs;
   causing display of the notification information on the at least one of the plurality of display areas; and
   restricting display on other display areas other than the at least one of the plurality of display areas.

* * * * *